(12) United States Patent
Leforestier et al.

(10) Patent No.: US 12,434,656 B2
(45) Date of Patent: Oct. 7, 2025

(54) RESTRAINING DEVICE, RESTRAINING ASSEMBLY AND SEAT UNIT

(71) Applicant: Autoliv Development AB, Vargarda (SE)

(72) Inventors: Sylvain Leforestier, Doudeauville (FR); Frederic Charpentier, Le Vauroux (FR); Christophe Fleury, Chars (FR); Marc Marchand, Le Vaumain (FR); Olivier Richez, Rouen (FR); Erle Nedelec, Gournay-en-bray (FR); Julien Halgrin, Doudeauville en Vexin (FR); Laurent Lengaigne, La Chaussée (FR); Jean-Yves Burel, Bully (FR); Laurent Hellot, La Feuillie (FR); Carole Gailhard, Gournay en Bray (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/839,588

(22) PCT Filed: Dec. 15, 2022

(86) PCT No.: PCT/EP2022/086207
§ 371 (c)(1),
(2) Date: Aug. 19, 2024

(87) PCT Pub. No.: WO2023/160859
PCT Pub. Date: Aug. 31, 2023

(65) Prior Publication Data
US 2025/0162532 A1   May 22, 2025

(30) Foreign Application Priority Data
Feb. 24, 2022 (DE) .................. 10 2022 104 440.8

(51) Int. Cl.
*B60R 21/231* (2011.01)
*B60R 21/00* (2006.01)
*B60R 21/2338* (2011.01)

(52) U.S. Cl.
CPC .... *B60R 21/23138* (2013.01); *B60R 21/2338* (2013.01); *B60R 2021/0032* (2013.01); (Continued)

(58) Field of Classification Search
CPC .......... B60R 21/23138; B60R 21/2338; B60R 2021/0032; B60R 2021/0048; B60R 2021/0058; B60R 2021/23386
See application file for complete search history.

(56) References Cited

U.S. PATENT DOCUMENTS

| 5,632,506 A | 5/1997 | Shellabarger |
| 7,665,761 B1 | 2/2010 | Green et al. |

(Continued)

FOREIGN PATENT DOCUMENTS

| DE | 10 2017 131140 A1 | 6/2019 |
| DE | 202019106282 U1 | 11/2019 |

(Continued)

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson

(57) ABSTRACT

A restraining device of a seat unit protecting a person without relying on a supporting surface. The first part extends from its first end in a first direction over the shoulder of a person sitting in the vehicle seat to a backrest-distal second end being located in front of the person's head and/or torso, and in a second direction from a person-outer third end to a person-inner fourth end. The second part extends in a third direction from a fifth end to a sixth end and from a backrest-proximate seventh end to a backrest-distal eighth end, such that a least an upper section of the second part extends laterally of the person's head. The third part extends (Continued)

Figure 1:
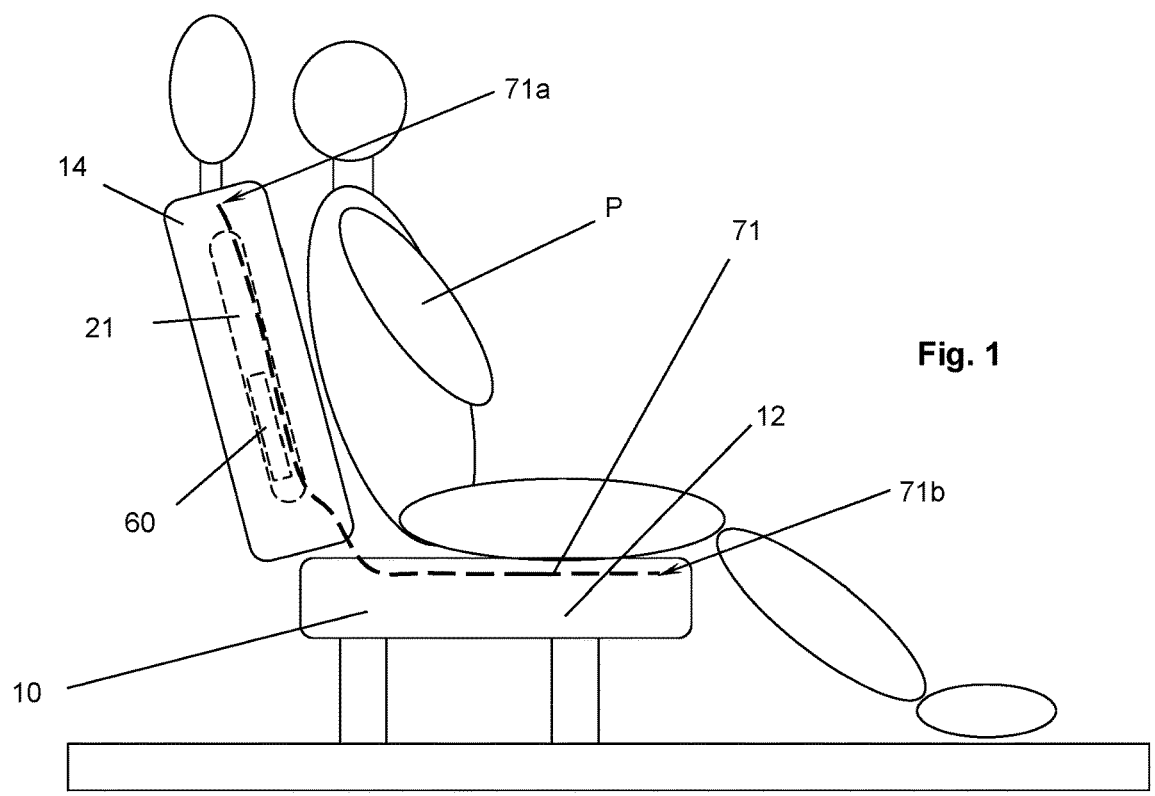

in the second direction from a person-outer ninth end to a person-inner tenth end, such that at least an upper section of the third part faces the person's face.

18 Claims, 6 Drawing Sheets

(52) U.S. Cl.
 CPC ............... *B60R 2021/0048* (2013.01); *B60R 2021/0058* (2013.01); *B60R 2021/23386* (2013.01)

(56) References Cited

U.S. PATENT DOCUMENTS

| | | | | |
|---|---|---|---|---|
| 9,707,922 | B2* | 7/2017 | Wiik | B60R 21/23138 |
| 10,023,147 | B2* | 7/2018 | Kwon | B60R 21/23138 |
| 10,543,800 | B2* | 1/2020 | Kwon | B60R 21/233 |
| 10,543,801 | B2* | 1/2020 | Kwon | B60R 21/2338 |
| 10,870,405 | B2* | 12/2020 | Kwon | B60R 21/207 |
| 10,974,686 | B2* | 4/2021 | Moon | B60R 21/207 |
| 11,052,861 | B2 | 7/2021 | Park et al. | |
| 11,155,232 | B2* | 10/2021 | Moon | B60R 21/2338 |
| 11,267,434 | B2* | 3/2022 | Kang | B60R 21/207 |
| 11,377,062 | B2* | 7/2022 | Kwon | B60R 21/231 |
| 11,479,202 | B2* | 10/2022 | Kwon | B60R 21/23138 |
| 11,618,403 | B2* | 4/2023 | Kang | B60R 21/2338 280/730.1 |
| 12,012,064 | B2* | 6/2024 | Smitterberg | B60R 21/205 |
| 12,240,404 | B2* | 3/2025 | Weimer | B60R 21/23138 |
| 2006/0131847 | A1 | 6/2006 | Sato et al. | |
| 2009/0206582 | A1 | 8/2009 | Kumagai et al. | |
| 2018/0326938 | A1 | 11/2018 | Rickenbach et al. | |
| 2019/0283700 | A1 | 9/2019 | Kwon | |
| 2019/0389421 | A1 | 12/2019 | Sturm et al. | |
| 2021/0197749 | A1 | 7/2021 | Wiik et al. | |

FOREIGN PATENT DOCUMENTS

| | | |
|---|---|---|
| DE | 10 2019 124091 A1 | 7/2020 |
| EP | 3 527 440 B1 | 10/2020 |
| EP | 3 862 231 A1 | 8/2021 |
| JP | 2010-76640 A | 4/2010 |
| JP | 2021 024312 A | 2/2021 |
| KR | 2019 0126213 A | 11/2019 |

* cited by examiner

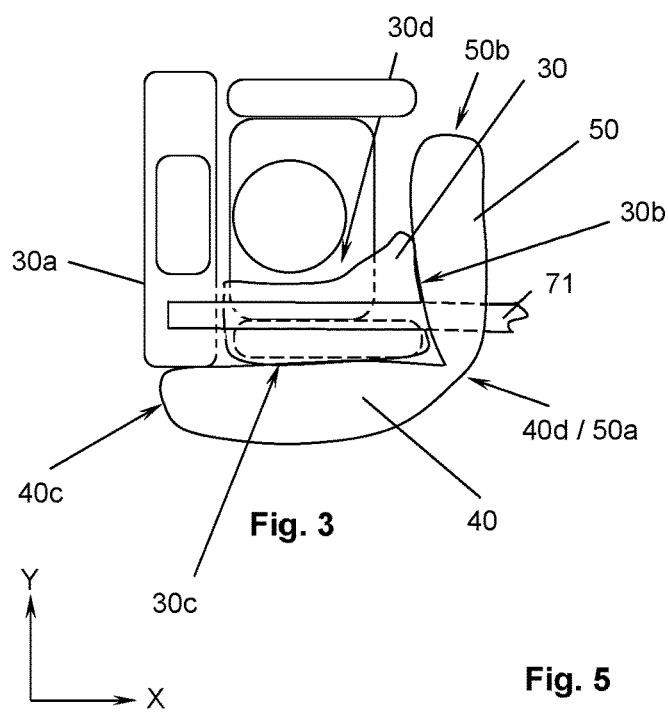
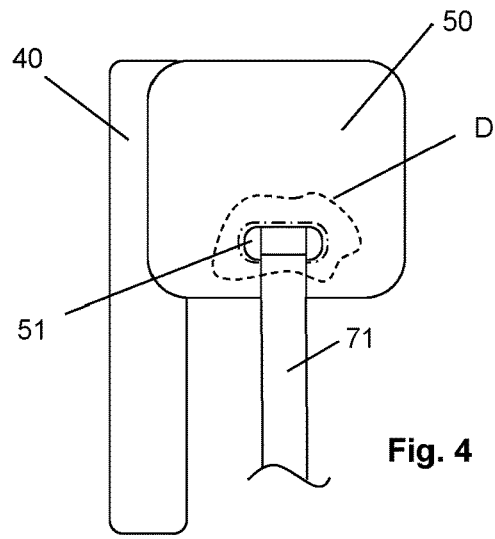
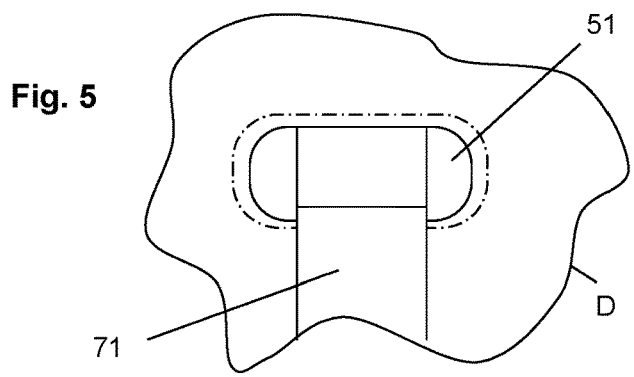
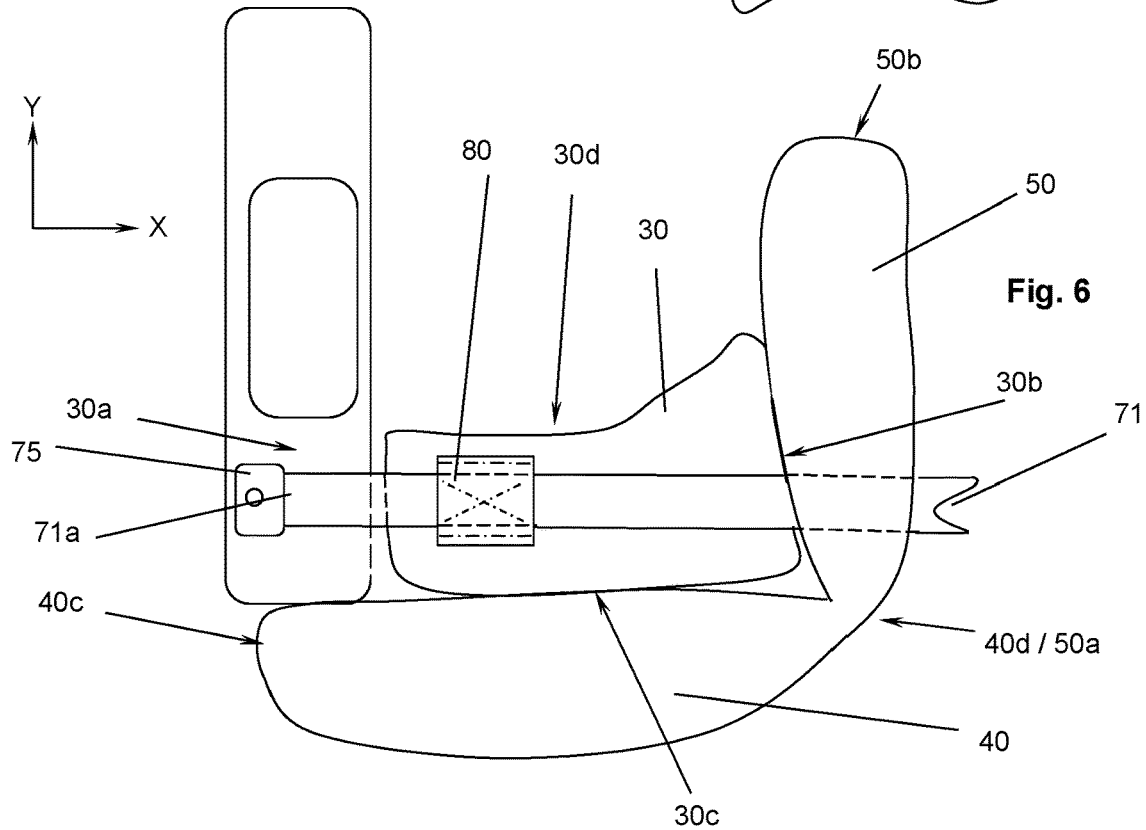

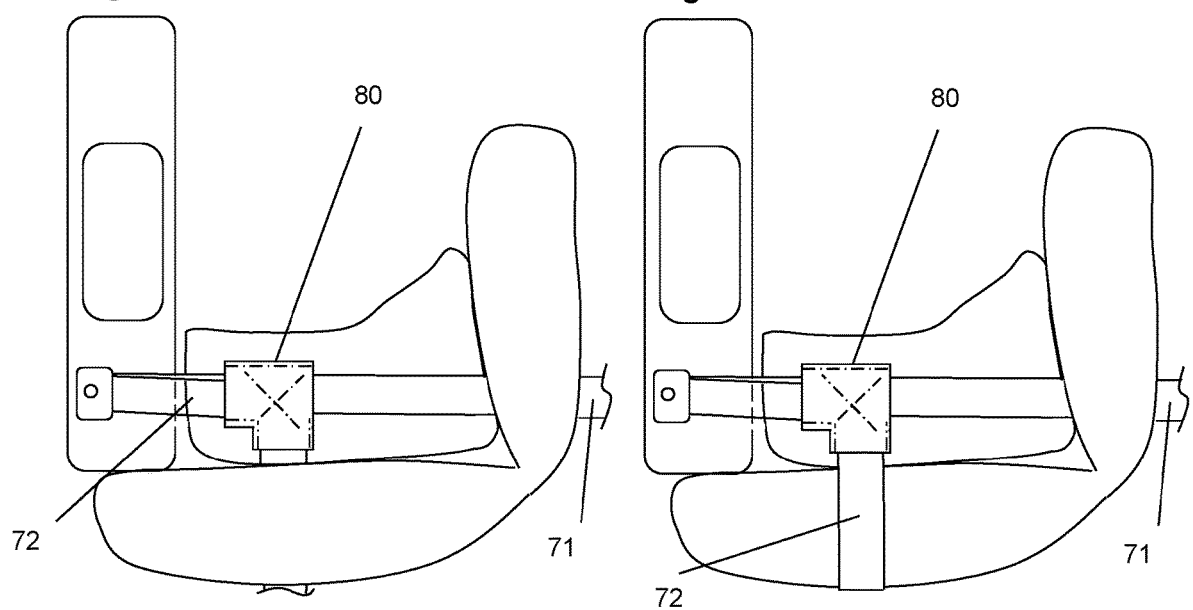
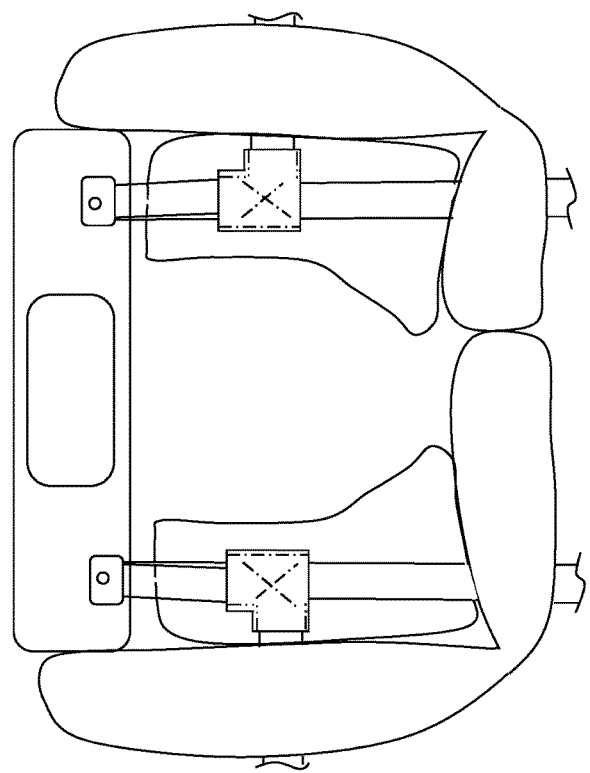

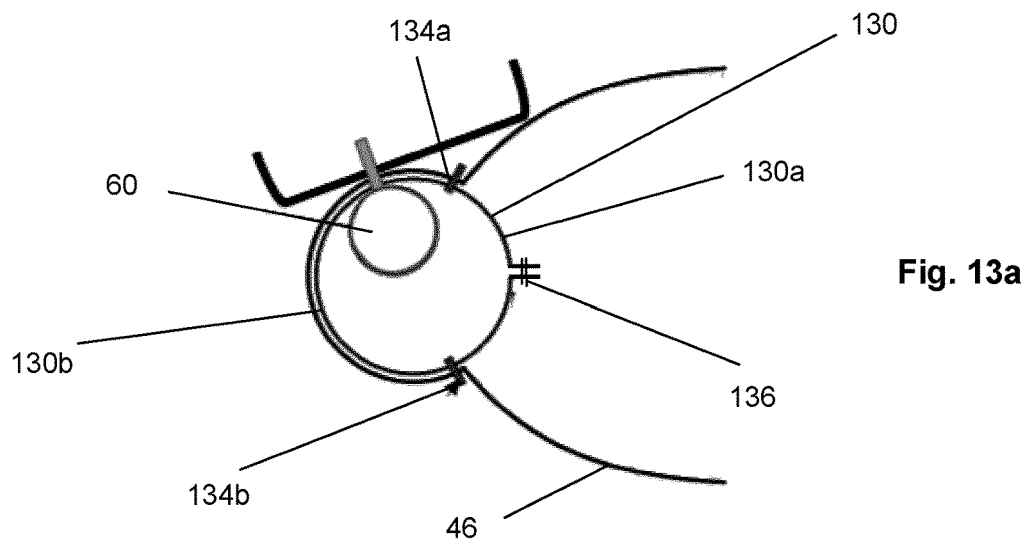
Fig. 13a
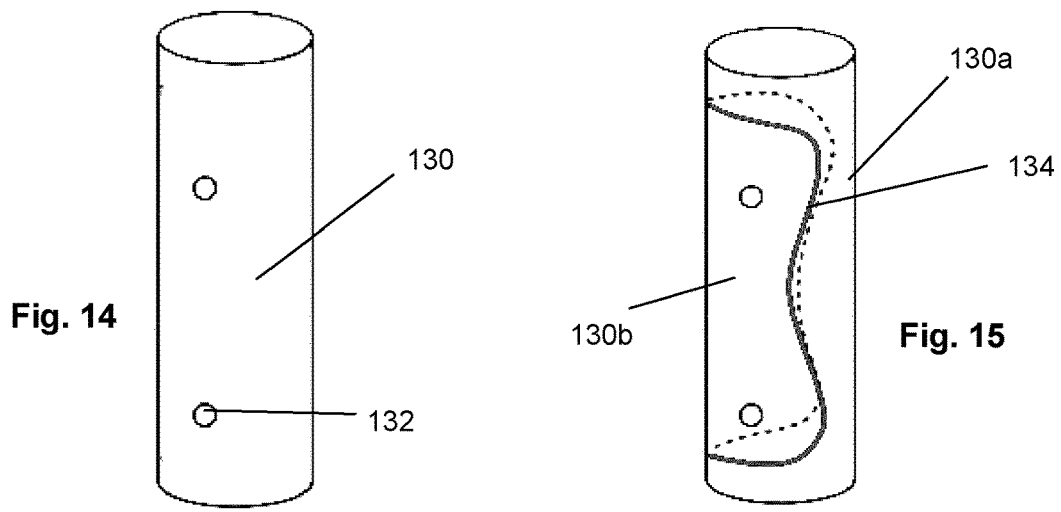
Fig. 14
Fig. 15
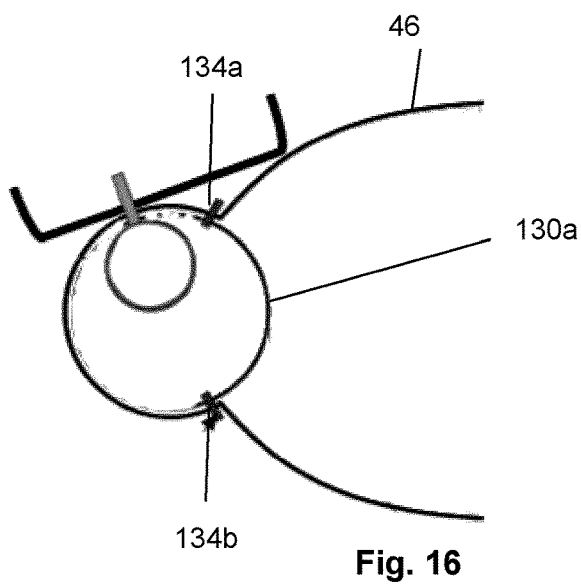
Fig. 16

RESTRAINING DEVICE, RESTRAINING ASSEMBLY AND SEAT UNIT

The invention relates to a restraining device, to a restraining assembly comprising such a restraining device and an inflator, and to a seat unit comprising a vehicle seat and such an airbag assembly according to claim 16.

A generic restraining device—and thus a generic restraining assembly and a generic seat unit—is known from EP 3 527 440 B1. In this document an airbag cushion is described that extends adjacent or partially over the shoulder of the occupant sitting in the vehicle seat. The deployed airbag cushion is held by a belt such that this airbag cushion can restrain the occupant without the need of a supporting surface (for example an instrument panel) like traditional frontal airbag cushions need.

Starting from this prior art it is an object of the invention to provide a restraining device which gives an even enhanced level of protection in a variety of accident scenarios.

This task is solved by a restraining device as set forth in the claims herein.

The restraining device according to the invention comprises an airbag cushion having a first part which extends over the shoulder of the occupant at least when this first part is in its deployed state. This first part has a backrest-proximate first end. From this first end the first part extends to a second end being in a first direction remote from the first end.

According to the invention, the airbag cushion additionally comprises a second part and a third part, wherein the second part extends laterally from the occupant, such that it has at least an upper section being located laterally from the occupant's head and the third part is located in front of the occupant, when the airbag cushion is deployed.

Consequently, the deployed airbag cushion has the following structure:

The first part extends from its first end in a first direction to second end and extends in a second direction from a third end to a fourth end. The second part which is connected to the first part extends in a third direction from a fifth end to a sixth end and from a seventh end to an eighth end, such that at least an upper section of the second part extends laterally of the person's head. The third part extends in the second direction from a ninth end to a tenth end.

Each of the parts is connected to each of the other parts, such that the deployed airbag cushion has a self-supporting, three-dimensional structure.

Preferably, the eighth end of the second part and the ninth end of the third part are connected to one another at least indirectly and at least in sections, such that the projection of these parts in the third direction is essentially L-shaped. This shape usually perfectly fits into a vehicle and additionally it eases the production.

It is often preferred that the second part forms a "full" side airbag, meaning that it protects not only the head but also at least a part of the occupant's torso. In this case the second part extends from the third end of the first part in the third direction (Z-direction) to both sides of the first part such that it comprises the upper section extending laterally of the person's head and a lower section extending laterally of the person's torso.

In an especially preferred embodiment, the restraining device additionally comprises a first belt for positioning the deployed airbag cushion relative to the vehicle seat even when an external force (usually exerted by the occupant) is applied to the airbag cushion, especially to its third part. This enhances the self-supporting abilities of the restraining device and especially makes it independent from a supporting surface in front of the third part, such that it can restrain the person without the need of a support by the vehicle structure. This can especially be relevant (but not only) for self-driving cars with flexible sea arrangements.

In a preferred configuration, this first belt extends through the airbag cushion, especially through a first tunnel in the third part. This leads to a very effective positioning and restraining of the airbag cushion by the first belt.

Even more preferred, the restraining device comprises a second belt extending along a person-remote surface area of the airbag cushion, especially along a person-outer surface of the second part. In this case, the restraining device can be completely independent from supporting surfaces. Since the second part extends up to the occupant's head, also the second belt can extend through a tunnel, namely a second tunnel in the second part. Alternatively the second belt can extend over the sixth end of the second part.

In order to make sure that the belt(s) cannot come into direct contact with occupant's neck, it/they is/are preferably connected to the first part, for example by means of a load bearing patch, wherein it is preferred that the belt(s) cannot slide in this load bearing patch.

In order to better restrain the occupant's chest, the first part may widen towards its second end, such that its fourth end comprises a concave surface area.

Preferably, the airbag cushion is filled with gas via the second part, especially in a traditional "side airbag way", meaning that the inflator is located inside the second part near the seventh end of the second part. An assembly comprising the restraining device and the inflator is called "restraining assembly".

In a preferred embodiment of the restraining assembly, the second part comprises an outer skin and a flexible shaping element being located inside the outer skin at the seventh end of the second part. This shaping element has an inner first section and this shaping element is attached to the outer skin via at least two connection sections in such a way that at least a section of the inflator is circumferentially encircled by the outer skin and the first section of the shaping element in such a way that the inflator is encircled by the outer skin in an angle between 20° and 340°, preferably in an angle between 45° and 340°, and even more preferably in an angle between 180° and 300°. By this means the dimensions of the deployed outer skin can be reduced in the region of the inflator, where large dimensions are unnecessary or even disadvantageous.

The shaping element can be tube-shaped such that it additionally comprises a second section extending along the outer skin of the second part. This can ease the production since the positioning of the shaping element is made easy and additionally a protection layer for the outer skin is provided. In this configuration, the connection sections can be parts of a closed connection such that the second section of the tube-shaped shaping element is located inside the closed connection. By this measure, the forces occurring when the inflator is exhausting gas can be distributed over a larger area.

It needs to be mentioned that the use of such an inventive shaping element as described above is not limited to a restraining assembly as claimed in this application, but can also be applied to over kinds of airbag assemblies comprising an inflator being located inside an airbag cushion, especially to side airbag assemblies in which the inflator is located proximate the rear end of the airbag cushion.

In the mounted state, the restraining assembly is usually attached to a vehicle seat in such that the second part is attached to the backrest in the manner of a traditional side airbag. The assembly comprising the vehicle seat and the restraining assembly is called seat unit.

Such a seat unit can comprise two restraining assemblies, namely a first restraining assembly whose first part of its airbag cushion extends over the left shoulder of the person and a second restraining assembly whose first part of its airbag cushion extends over the right shoulder of the person, such that the occupant is protected from all sides.

In order to prevent the occupant from slipping through the two airbag cushions in case of a pure frontal accident, it can be preferred that the two airbag cushions are asymmetric in respect to each other.

Figure 2:
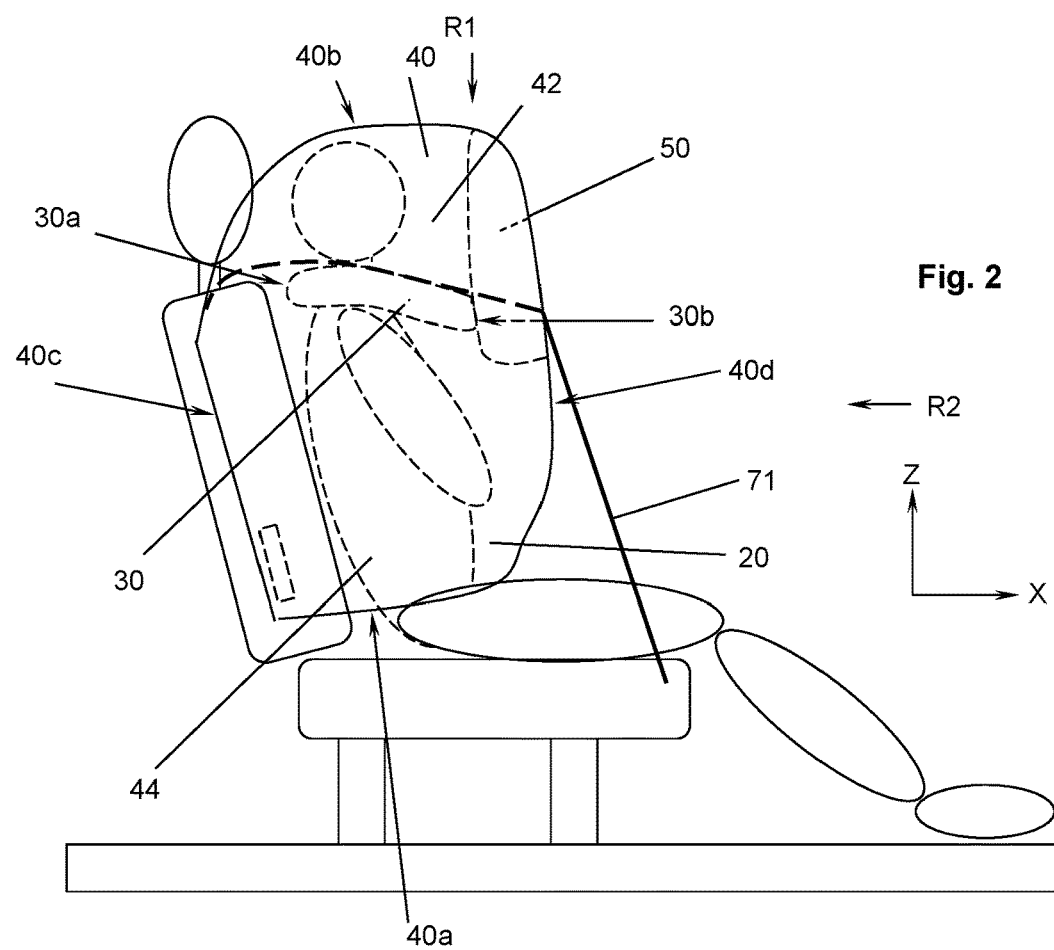
Figure 9:
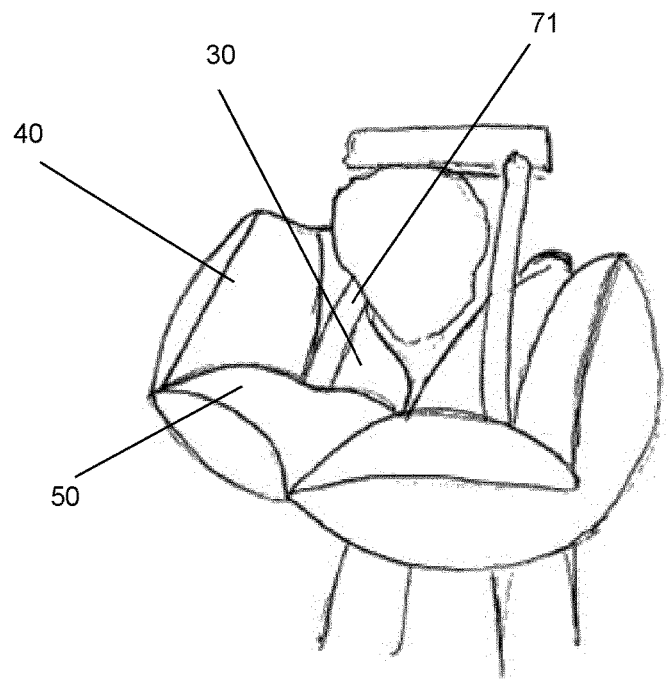
Figure 10:
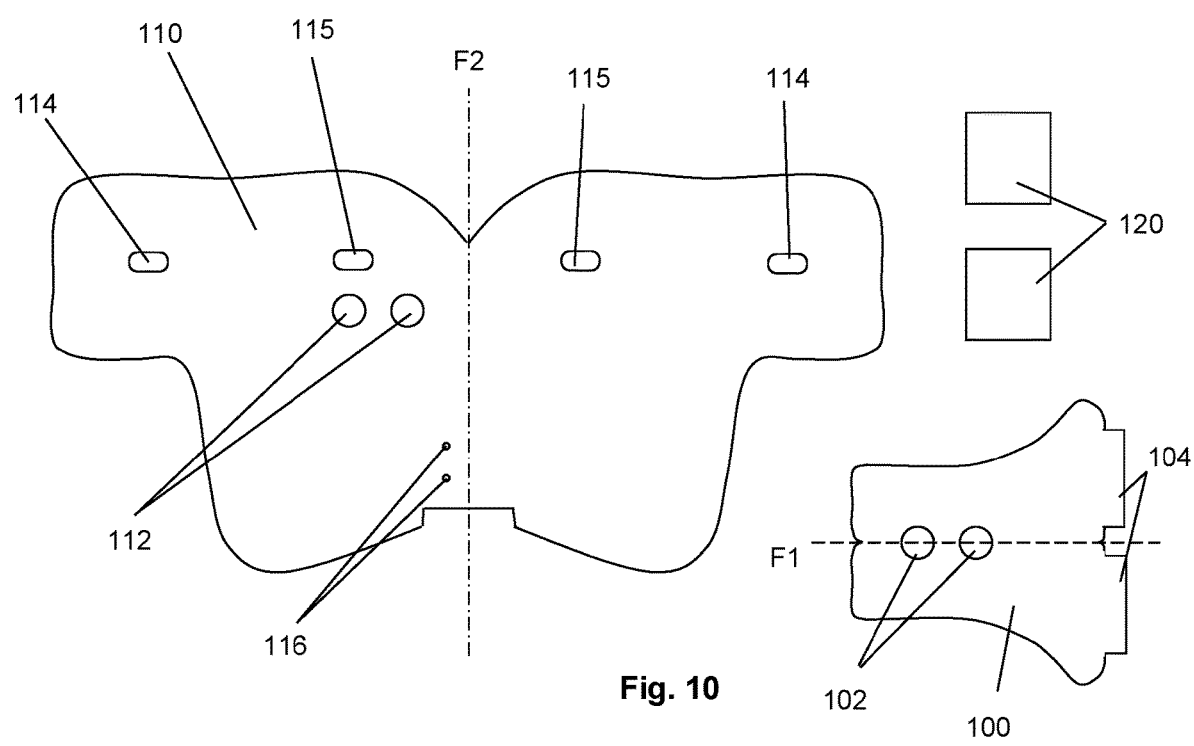
Figure 11:
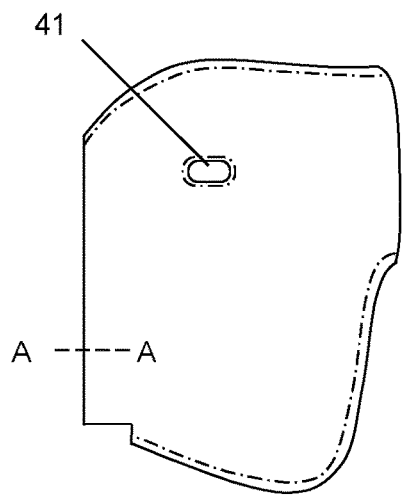
Figure 12:
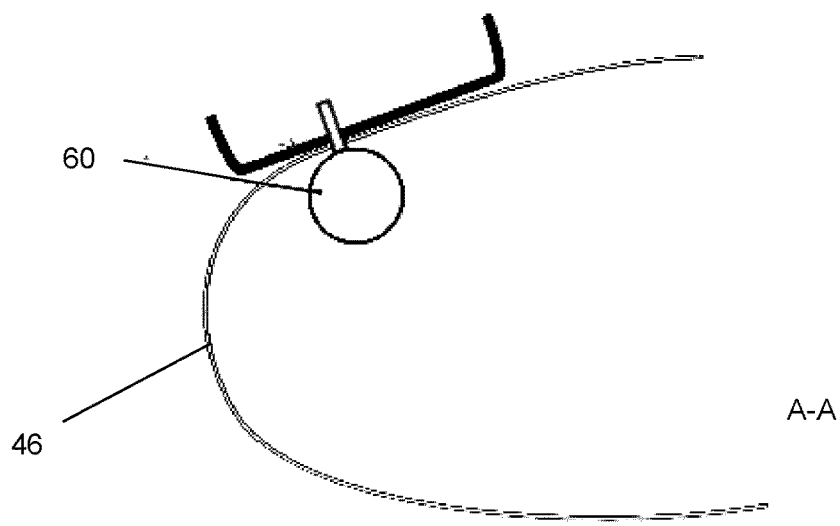
Figure 13:
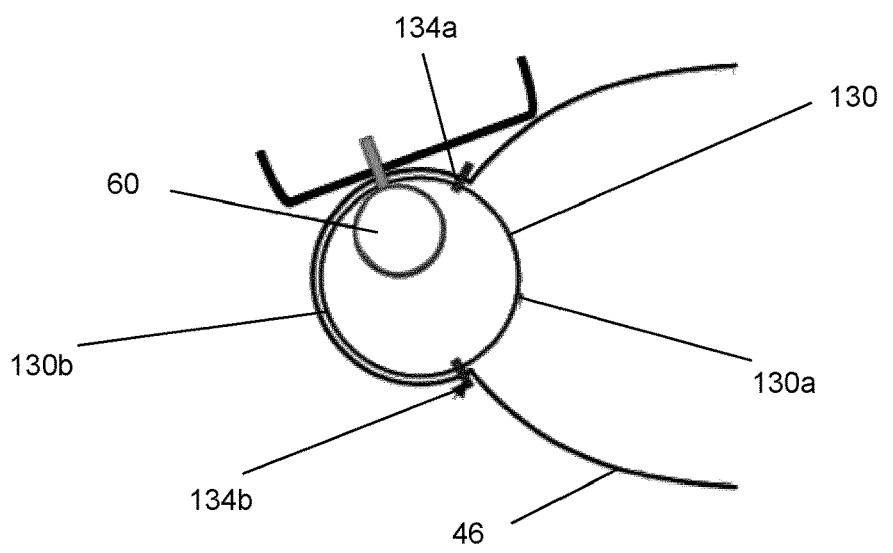

The invention will now be described in more detail by means of preferred embodiments in view of the figures. The figures show:

FIG. 1 a schematic side view onto a seat unit comprising a vehicle seat and a restraining assembly according to a first embodiment of the invention, wherein a person is seated in the vehicle seat and wherein the airbag cushion of the restraining assembly is in its un-deployed resting state, FIG. 2 the item shown in FIG. 1, wherein the airbag cushion is in its fully deployed state, FIG. 3 a top view to what is shown in FIG. 2 (viewed from direction R1 in FIG. 2), FIG. 4 a strictly schematic front view onto the restraining device of the restraining assembly of FIGS. 2 and 3 from the front from direction R2 in FIG. 2, but with the seat and the person not being shown, FIG. 5 the detail D of FIG. 4, FIG. 6 essentially the restraining device of FIG. 3 but with some more details and with the seat and the person not being shown, FIG. 7 a second embodiment of the invention in a representation according to FIG. 6, FIG. 7a a variation to what is shown in FIG. 7, FIG. 8 a third embodiment of the invention in a representation according to FIG. 7, FIG. 9 a fourth embodiment of the invention in a schematic perspective view, FIG. 10 the cuttings necessary for forming an airbag cushion as it is for example shown in FIG. 6, FIG. 11 the complete airbag cushion being sewn form the cutting shown in FIG. 10 in a view from the side, FIG. 12 the sectional view taken along line A-A in FIG. 11 in the deployed state of the airbag cushion, FIG. 13 an improved side airbag in a representation according to FIG. 12, FIG. 13a a variation to what is shown in FIG. 13, FIG. 14 a shaping element being a part of the side airbag shown in FIG. 13, FIG. 15 the shaping element of FIG. 14 with the position of a sewing being shown, and FIG. 16 a variation to what is shown in FIG. 13.

FIGS. 1 to 5 show a first embodiment of the invention in schematic representations. FIG. 1 shows a seat unit being comprised of a vehicle seat 10 and a restraining assembly. According to the definitions chosen in this application, this restraining assembly comprises an airbag cushion 20, an inflator 60 for inflating this airbag cushion 20 and being located inside this airbag cushion 20, and a first belt 71 being attached to both, the vehicle seat 10 and the airbag cushion 20. The airbag cushion and the first belt 71 constitute the restraining device. This restraining device and the inflator constitute the restraining assembly. In FIGS. 1, 2 and 3 additionally a person P sitting in the vehicle seat 10 is shown, in order to make clear the position of the parts of the airbag cushion 20 relative to this person P when the airbag cushion is deployed.

As can be seen in FIG. 1, the packed airbag cushion 21 is attached to the backrest 14 of the vehicle seat 10 (for example via inflator studs being attached to the frame of the backrest as is known from the prior art). Usually the packed airbag cushion 21 is located inside the backrest 14, meaning inside the upholstery of the backrest 14. The first belt 71 to which a section of the airbag cushion 20 is attached, extends from a first end 71a being attached to the backrest to a second end 71b being attached to the seating 12.

FIGS. 2, 3 and 6 show the deployed state of the airbag cushion 20. One can see that this airbag cushion 20 comprises three parts, namely a first part 30, a second part 40 and a third part 50. The first part 30 extends in a first direction (the X-direction) from a first end 30a located next to the backrest 14 of the vehicle seat 10 over the shoulder of the person P to a second end 30b. The term "extending in the X-direction" is not to be understood in such a way that the first part only extends in this direction (indeed it can be tilted or curved relative to this direction), but in any case the first end 30a and the second end 30b have different X-coordinates such that the first end is the backrest-proximate end and the second end is the backrest distal end. The deployed first part further extends in a second direction (Y-direction) from a (occupant distal) third end 30c to a (occupant proximate) fourth end 30d. In the embodiment shown, the fourth end 30d is concave at least in sections. The first part 30 has (of course) an upper surface, to which the first belt 71 is attached.

The airbag cushion 20 further comprises a second part 40 which essentially forms a side airbag and thus extends in a third direction (Z-direction) from a fifth end (lower end) 40a to a sixth end (upper end) 40b and in the first direction from a seventh end (rear end) 40c to an eighth end (forward end) 40d.

The first part 30 is attached to the second part 40, at least around an overflow which connects the chamber enclosed by the second part with the chamber enclosed by the first part 30. This will be explained in more detail in view of FIG. 10.

In this embodiment, and this is preferred, the second part 40 extends—in the deployed state—in the third direction (Z-direction) from a fourth end, which is located under the first part 30 to a sixth end, which is located above the first part 30. So, this second part 40 comprises an upper section 42 being allocated to the head of the occupant and a lower section 44 being allocated to at least a section of the occupant's torso.

The third part 50 extends from a ninth end 50a, which essentially coincides with the eighth end 40d of the second part 40, in the second direction (Y-direction) to a tenth end 50b. This third part 50 at least has an upper section being located in front of the occupant's head as can especially be seen from FIG. 2. This third part 50 can extend to a lower end being located below the second end 30b of the first part 30, but this is optional. At least a section of the second end 30b of the first part 30 is attached to the impact wall of the third part 50, for example by sewing, gluing, welding or the like. In case that an overflow is present between the first part and the third part, the respective connection can extend around this overflow.

So, each of the three parts 30, 40, 50 is attached to each of the other parts, such that the deployed airbag cushion 20 forms a three-dimensional, self-supporting structure and especially does not need a restraining surface in front of the occupant, as a traditional front airbag cushion needs. The first belt 71 even enhances this self-supporting ability of the restraining device, as will now be described:

As has already been mentioned above, the first end 71*a* of the first belt 71 is attached to the vehicle seat 10, preferably at an upper end of the backrest 14, and the second end 71*b* is attached to the lower part of the vehicle seat 10, especially near the front end of the seating 12. The respective attachment to the vehicle seat 10 can take place via brackets 75 being connected to a frame part (not shown in detail). In other embodiments, the at least one of the end sections can be rolled onto a roll, especially a roll of a retractor.

As can for example be seen from FIG. 6, a section of the first belt 71 is attached to a section of the upper surface of the first part 30, for example by means of a load bearing patch 80 and at least on seam, but in principle also a pure direct attachment could be possible. Providing a load bearing patch 80 has the advantage that the relatively high forces that might occur is distributed over a larger area so that especially a tearing of the first part 30 is prevented. A connection of the first belt 71 to the first part 30 is usually necessary in order to prevent the first belt 71 from coming into contact with the occupant's neck which would be a potential threat. The first belt 71 extends through a first tunnel 51 in the third part 50, as can best be seen from FIGS. 2, 4 and 5. Especially by this feature, but also by the connection to the first part 30, the first belt 71 at least limits a movement of the third part 50 in X-direction when the occupant hits the impact surface of this third part during an accident such that the occupant is restrained.

FIG. 7 shows a second embodiment. This embodiment comprises additionally a second belt 72 whose first end 72*a* is also attached to the backrest 14, preferably at the upper end of the backrest 14; the first belt 71 and the second belt 72 can use the same bracket 75 for this attachment. The second belt 72 is also attached to the upper surface of the first part 30 and a joint load bearing patch 80' can be used for this as it is shown in FIG. 7. In contrast to the first belt 71, the second belt 72 does not extend through the first tunnel 51 but through a second tunnel 41 in the second part 40. The second end of the second belt 72 is also attached to the seat, especially in a region of the seating 12, such that a lower section of the second belt 72 extends along the outer surface of the lower section 44 of the second part 40, such that the second belt 72 prevents the airbag cushion and especially its second part 40 from moving in the −Y-direction even if no supporting surface (like an inner structure of the vehicle, for example a door) is provided, such that the occupant is restrained also in this direction. So, in this embodiment the restraining device is fully self-supporting and does not need any supporting surfaces.

As an alternative, the second belt 72 could extend over the sixth end (top end) 40*b* of the second part 40, such that a section of the second belt extends along the whole height of the outer wall of this second part 40. This alternative (in a view according to FIG. 7) is shown in FIG. 7*a*.

FIG. 8 shows a third embodiment in a representation according to FIG. 7. Here, two restraining assemblies are provided, one on the right side of the vehicle seat and one on the left side of the vehicle seat. In a principle these two restraining devices could be mirror-symmetrical, but it will often be preferred that they are not mirror-symmetrical, especially such that one of the third parts is larger than the other third part, such that the border between those two third parts is offset from the middle axis of the vehicle seat, such that the front restraining function is taken over mainly by one of the two restraining devices, such that the head of the occupant cannot slip through the two third parts.

As can be seen from FIG. 9, such a "doubling" of the restraining devices can also be applied to the case that each restraining device only comprises one belt. Providing one restraining device with one belt and the over restraining device with two belts would of course also be possible.

FIG. 10 shows schematically an example for the cuttings being necessary in order to manufacture the airbag cushion of the second embodiment. In FIG. 10 only strictly necessary cuttings are shown, but of course additional cuttings, for example for forming enforcement layers, inner tethers or the like can be used, but since those are not necessary in order to understand the structure, they are not shown. Further, outer tethers or other outer elements could be used, for example in form of at least one sail connecting at least two of the parts in order to provide an additional restraining element. In the embodiment shown, only four cuttings are necessary, namely a first cutting 100 for the first part, a second cutting 110 for the second and the third part, and cuttings 120 for the tunnel walls. Both, the first cutting 100 and the second cutting 110 are of the "butterfly" type, meaning that they are folded along a folding line F1 and F2 respectively. Of course, this invention is not limited to the type of cuttings shown here. For example, each layer could be made from a distinct cutting. Further, providing a joint cutting for layers of the first part and third part is not mandatory.

The first cutting 100 shows at least one overflow opening 102 (here two overflow openings) and the second cutting 110 shows matching overflow openings 112. Additionally, the second cutting 110 shows two holes 114 for the first tunnel and two holes 115 for the second tunnel. Further, holes 116 for inflator studs are provided as is generally known form side airbags.

The sewing process could be for example be as follows: First, the first cutting 100 is sewn to the second cutting 110, especially around the overflow openings 102, 112. After this, the first cutting 100 can be folded and closed by an edge seam in order to form the first part. Then, the cuttings 120 for the tunnel walls can be sewn to the edges of their respective holes 114, 115 and then the first part can be sewn to the cutting 110 by means of protruding sections 104 of the first cutting 100. Finally, an edge seam for closing the cutting 110 to form the second part and the third part can be applied. Because the first part is connected to both, the second part and the third part, the third part is automatically bent out of the plane of the second part, such that the completely sewn airbag cushion looks as it is shown in FIG. 11 in a plane view onto the second part.

FIG. 12 shows a sectional view taken along line A-A in FIG. 11 in case that the airbag cushion is fully deployed. One can see a typical side airbag scenario, namely that the outer skin 46 of this side airbag (the second part is a side airbag) deploys beyond the rear end of the inflator 60. Further, one sees that at the position of this inflator 60 the side airbag has a rather large thickness. Both is usually not desired for the following reasons: One reason is that the deployed volume is uselessly large in this region but still needs to be filled so that inflation gas is wasted and a respectively large inflator must be used. Second, especially the part deploying rearwardly of the inflator can interfere with other parts of the vehicle, for example with parts of the vehicle seat or another inner structural part of the vehicle, which is usually not desired.

FIGS. 13 to 15 show a possibility of how this extra volume and deployment space can be minimized by using a shaping element 130. In a first—and often preferred—embodiment this shaping element 130 is tubular-shaped and extends around the usually cylinder-shaped inflator 60. It is attached to the outer skin 46 by means of a connection, usually a seam 134. The position of the seam 134 is shown in FIG. 15. This connection (seam 134) comprises two sections 134a, 134b extending essentially parallel to the inflator. In the embodiment shown, the connection is closed, but this is not absolutely necessary for the function. It is essential that the connection, or at least its sections 134a, 134b define a first section 130a of the shaping element 130 which is located in the inside of the side airbag cushion, such that a section of the outer skin 46 and this first section 130a encircle the inflator 60. In the first embodiment, in which the shaping element 130 is tubular, the remaining second section 130b extends along the outer skin 46 such that this area is double layered (which can be preferred in order to protect the outer skin 46 from inflation gases).

So, the inflator 60 is circumferentially encircled by the outer skin 46 and the first section 130a of the shaping element 130, wherein the inflator 60 is encircled by the outer skin 46 in an angle between 20° and 340°, preferably in an angle between 180° and 300° (shown is an angle of approximately 250°). Generally, an angle being 45° or larger is preferred. As can be seen directly by comparing FIGS. 12 and 13, the deployed outer skin is shortened at its rear end and its thickness is reduced in the region of the rear end.

In case that the tubular shaping element is made from a flat piece of material, it comprises a closing connection, for example a closing seam 136 which extends essentially parallel to the axial direction of the inflator. This is shown in FIG. 13a. In this case it will often be preferred that this closing connection is applied after the (in this stage not yet tubular) shaping element is attached to the outer skin.

FIG. 16 shows an embodiment in which the shaping element 130 exclusively consists of its first section 130, which leads to the same geometry as shown in FIG. 14, but providing a tubular shaping element 130 will often be preferred, because due to this shaping element some sections of the outer skin 46 are quite close to the inflator and will often need extra protection from the inflation gases.

As has already been mentioned, the use of such a shaping element is not limited to the claimed restraining assembly but can also be applied to other kind of airbag assemblies, especially side airbag assemblies comprising a side airbag cushion and an inflator.

LIST OF REFERENCE NUMBERS

10 vehicle seat
12 seating
14 backrest
20 airbag cushion
21 packed airbag cushion
30 first part
30a first end
30b second end
30c third end (person outer end)
30d fourth end (person inner end)
32 (fabric) element for fastening belt(s) to first part
40 second part
40a fifth end
40b sixth end
40c seventh end
40d eighth end
41 second tunnel
42 upper section of second part
44 lower section of second part
46 outer skin
50 third part
50a ninth end (outer end)
50b tenth end (inner end)
51 first tunnel
60 inflator
71 first belt
71a first end (attached to backrest)
71b second end
72 second belt
72a first end (attached to backrest)
72b second end
75 bracket
80 load bearing patch
100 cutting for first part
102 overflow opening
104 protruding section for sewing to third part
110 cutting for second and third part
112 overflow opening
114 hole for first tunnel
115 hole for second tunnel
116 hole for inflator stud
120 cutting for tunnel wall
130 shaping element
130a first (inner) section
130b second section
132 hole for inflator stud
134 connection (sewing)/position of sewing
134a, b sections of connection
136 closing seam
FL1, FL2 folding line
P person

The invention claimed is:

1. A restraining device of a seat unit, which seat unit further comprises a vehicle seat with a seating and a backrest adapted to support a person seated in the vehicle seat, said restraining device comprising:

an airbag cushion being deployable to a deployed state, wherein said airbag cushion comprises a first part having a backrest-proximate first end, wherein in the deployed state, said first part:

is configured to extend from the backrest-proximate first end thereof in a first direction over a shoulder of the person sitting in the vehicle seat to a backrest-distal second end (30b) being located in front of the person's head and/or torso, and extends in a second direction from a person-outer third end to a person-inner fourth end, wherein the airbag cushion additionally comprises a second part being connected to the first part, and a third part being connected to the first part and to the second part, wherein in the deployed state:

said second part extends in a third direction from a fifth end to a sixth end and from a backrest-proximate seventh end to a backrest-distal eighth end, such that at least an upper section of said second part is configured to extend laterally of the person's head, and said third part extends in the second direction from a person-outer ninth end to a person-inner tenth end, such that at least an upper section of said third part is configured to face the person's face; and the restraining device further comprises a first belt for securing the airbag cushion to the vehicle seat, the first belt and the airbag cushion forming a restraining assembly, the first belt secured at a first end to the backrest and at a second end to the seating, and the first belt further configured to extend over an upper surface of the first part and through the third part.

2. The restraining device of claim 1, wherein the backrest-distal eighth end of the second part and the person-outer ninth end of the third part are connected to one another at least indirectly and at least in sections.

3. The restraining device of claim 1, wherein the second part further comprises a lower section configured to extend laterally of the person's torso.

4. The restraining device of claim 1, wherein the first belt extends through a first tunnel in the third part.

5. The restraining device of claim 4, wherein the restraining device further comprises a second belt extending along a person-remote surface area of the airbag cushion.

6. The restraining device of claim 5, wherein the second belt extends through a second tunnel in the second part or extends over the sixth end of the second part.

7. The restraining device of claim 5, wherein the first belt and the second belt are connected to the first part by a load bearing patch.

8. The restraining device of claim 1, wherein the first belt is connected to the first part by a load bearing patch.

9. The restraining device of claim 1, wherein the person-inner fourth end of the first part comprises a concave surface area.

10. The restraining device of claim 1, wherein the restraining assembly further comprises an inflator being in fluid communication with the second part of the airbag cushion.

11. The restraining device of claim 10, wherein the inflator is located inside the second part adjacent to the backrest-proximate seventh end thereof.

12. The restraining device of claim 11, wherein the second part comprises an outer skin and a flexible shaping element being located inside the outer skin at the backrest-proximate seventh end, said flexible shaping element having an inner first section and said flexible shaping element being attached to the outer skin via at least two connection sections in such a way that at least a section of the inflator is circumferentially encircled by the outer skin and the inner first section of the flexible shaping element, wherein the inflator is encircled by the outer skin in an angle between 20° and 340°.

13. The restraining device of claim 12, wherein the flexible shaping element is tube-shaped and additionally comprises a second section extending along the outer skin of the second part.

14. The restraining device of claim 13, wherein the at least two connection sections are parts of a closed connection, wherein the second section of the tube-shaped flexible shaping element is located inside the closed connection.

15. The restraining device of claim 10, wherein the backrest-proximate seventh end of the second part of the airbag cushion is attached to the backrest of the vehicle seat at least indirectly.

16. The restraining device of claim 15, wherein said seat unit comprises two restraining assemblies, wherein a first restraining assembly whose first part of said airbag cushion is configured to extend over a left shoulder of the person and a second restraining assembly whose first part of said airbag cushion is configured to extend over a right shoulder of the person.

17. The restraining device of claim 16, wherein the two restraining assemblies are not mirror-symmetrical with respect to each other.

18. The restraining device of claim 17, wherein the upper section of the third part of one of the airbag cushions is configured to be located in front of the person's face.

* * * * *